United States Patent [19]

Van Tichelt

[11] 4,050,666
[45] Sept. 27, 1977

[54] MOLD EJECTOR MULTIPLIER

[76] Inventor: Jake W. Van Tichelt, 7340 Garden Lane, Portage, Mich. 49081

[21] Appl. No.: 743,398

[22] Filed: Nov. 19, 1976

[51] Int. Cl.² .......................... B28B 7/10; B29C 7/00; B29F 1/14
[52] U.S. Cl. ...................................... 249/68; 425/444
[58] Field of Search .............. 425/437, 438, 444, 139, 425/242 R, 247, 249; 249/67, 66 R, 68; 164/347

[56] References Cited

U.S. PATENT DOCUMENTS

| | | | |
|---|---|---|---|
| 2,304,899 | 12/1942 | Dupre | 164/347 |
| 2,485,283 | 10/1949 | Guelph | 425/444 |
| 3,137,905 | 6/1964 | Steinman et al. | 425/438 X |
| 3,334,378 | 8/1967 | Scherrer-Wirz et al. | 249/68 X |
| 3,479,698 | 11/1969 | Shaughnessy | 425/139 |
| 3,482,284 | 12/1969 | Rees | 425/139 X |
| 3,645,492 | 2/1972 | Edlis | 425/68 |
| 3,807,682 | 4/1974 | Catinella et al. | 425/444 X |
| 3,893,644 | 7/1975 | Drozick | 249/68 |
| 3,914,086 | 10/1975 | Hujik | 249/68 X |

*Primary Examiner*—J. Howard Flint, Jr.
*Attorney, Agent, or Firm*—Gordon W. Hueschen

[57] ABSTRACT

A mold ejector multiplier is described in which the mold ejector is attached to the fast acting piston of a dual piston hydraulic device consisting of a main cylinder having a closed bottom adapted to act both as a cylinder and as a reservoir for hydraulic fluid with an outer piston adapted to reciprocate in the cylinder and an inner piston adapted to reciprocate in a cylindrical bore in the outer piston. Both pistons are in contact with the hydraulic fluid in the hydraulic fluid reservoir, so that when one piston is pushed in, the other automatically is pushed out and vice versa. The relative size of the two pistons, advantageously, is such that the inner piston moves more than one unit length for each unit length of movement of the outer piston. The device is mounted in the actuating plate of the mold ejector system with the inner piston connected to a mold ejector and the outer piston arranged to abut a stationary part of the mold when the actuating plate is moved to actuate the ejectors. Engagement of the outer piston by the fixed part of the mold causes it to enter the cylinder and to propel the inner piston out. This multiplies the rate at which the ejector is moved into contact with the workpiece so that the workpiece can be dislodged and ejected from the mold without manual intervention.

31 Claims, 9 Drawing Figures

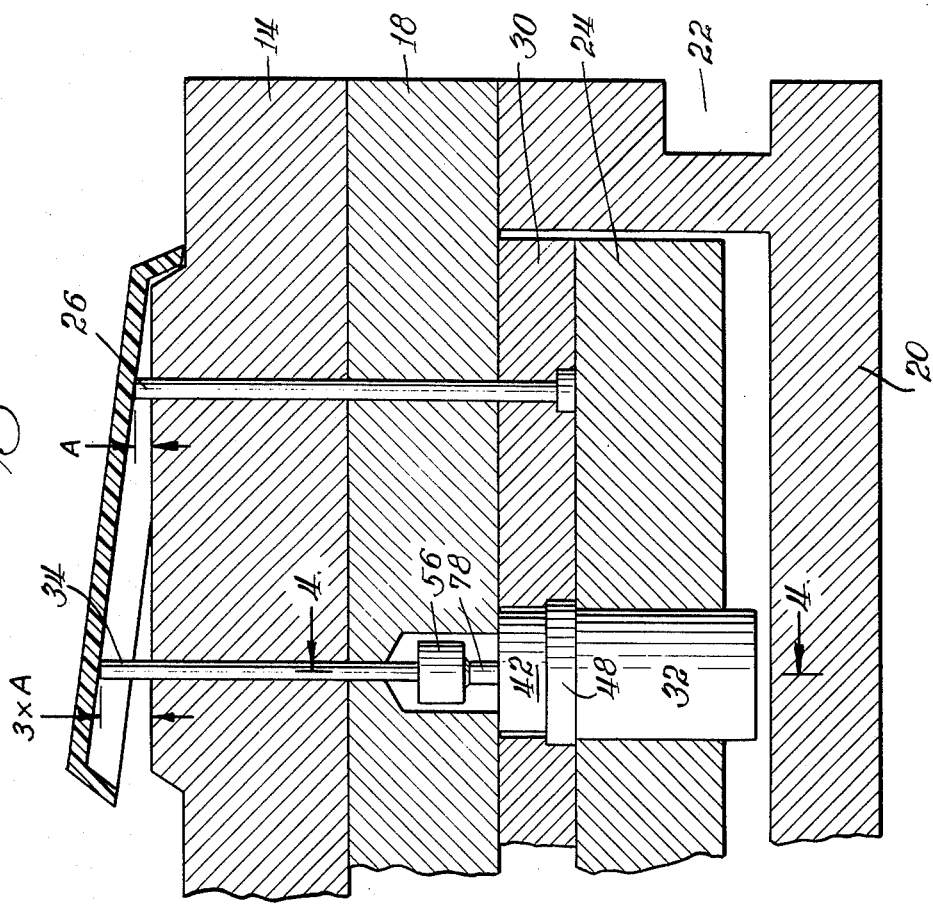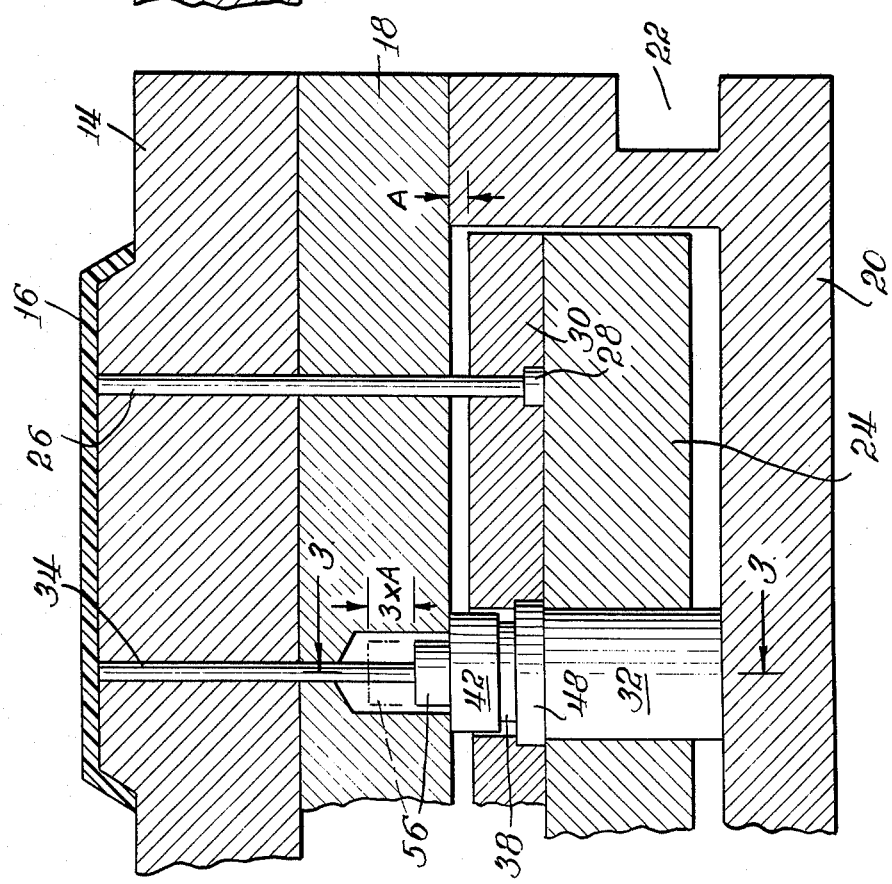

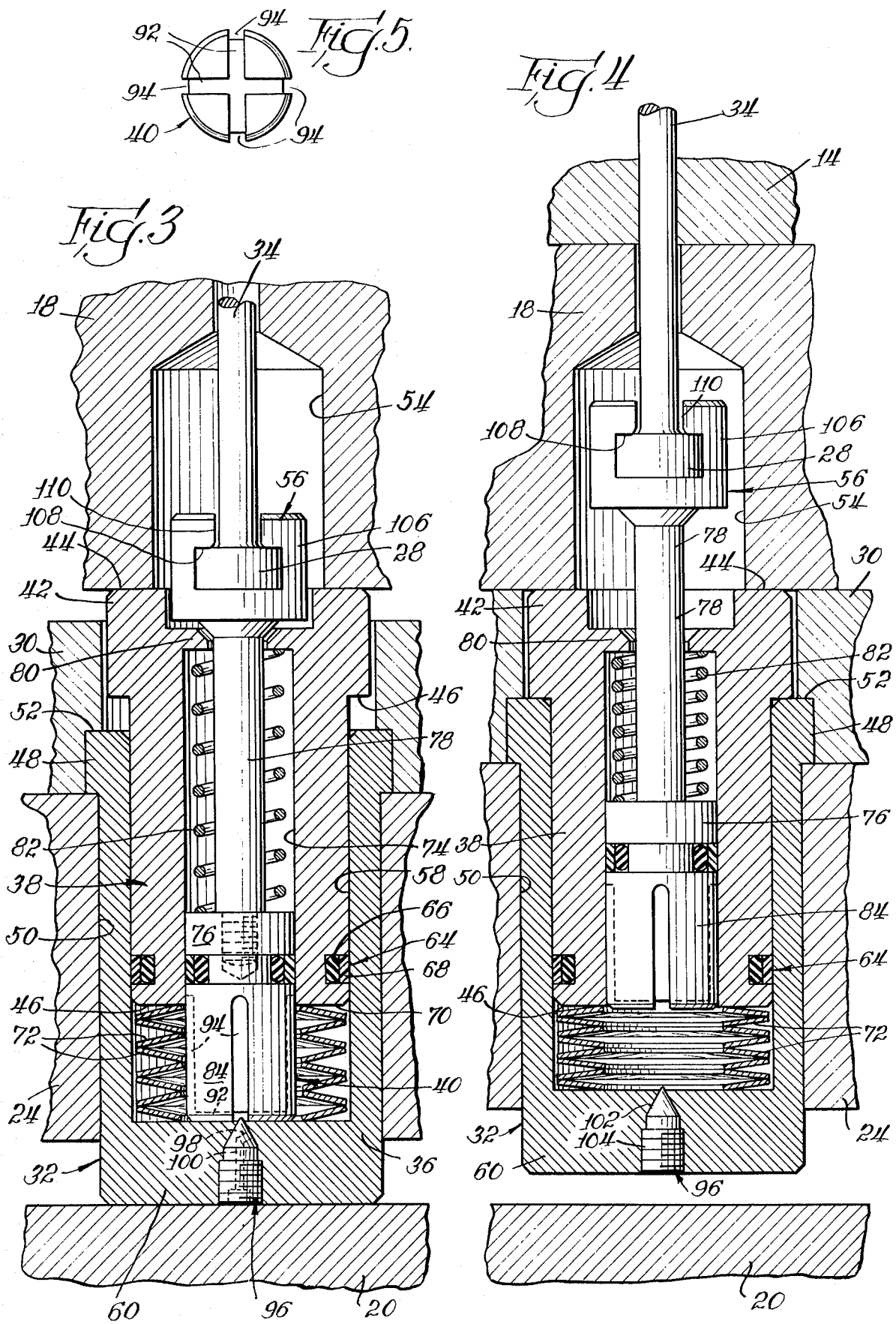

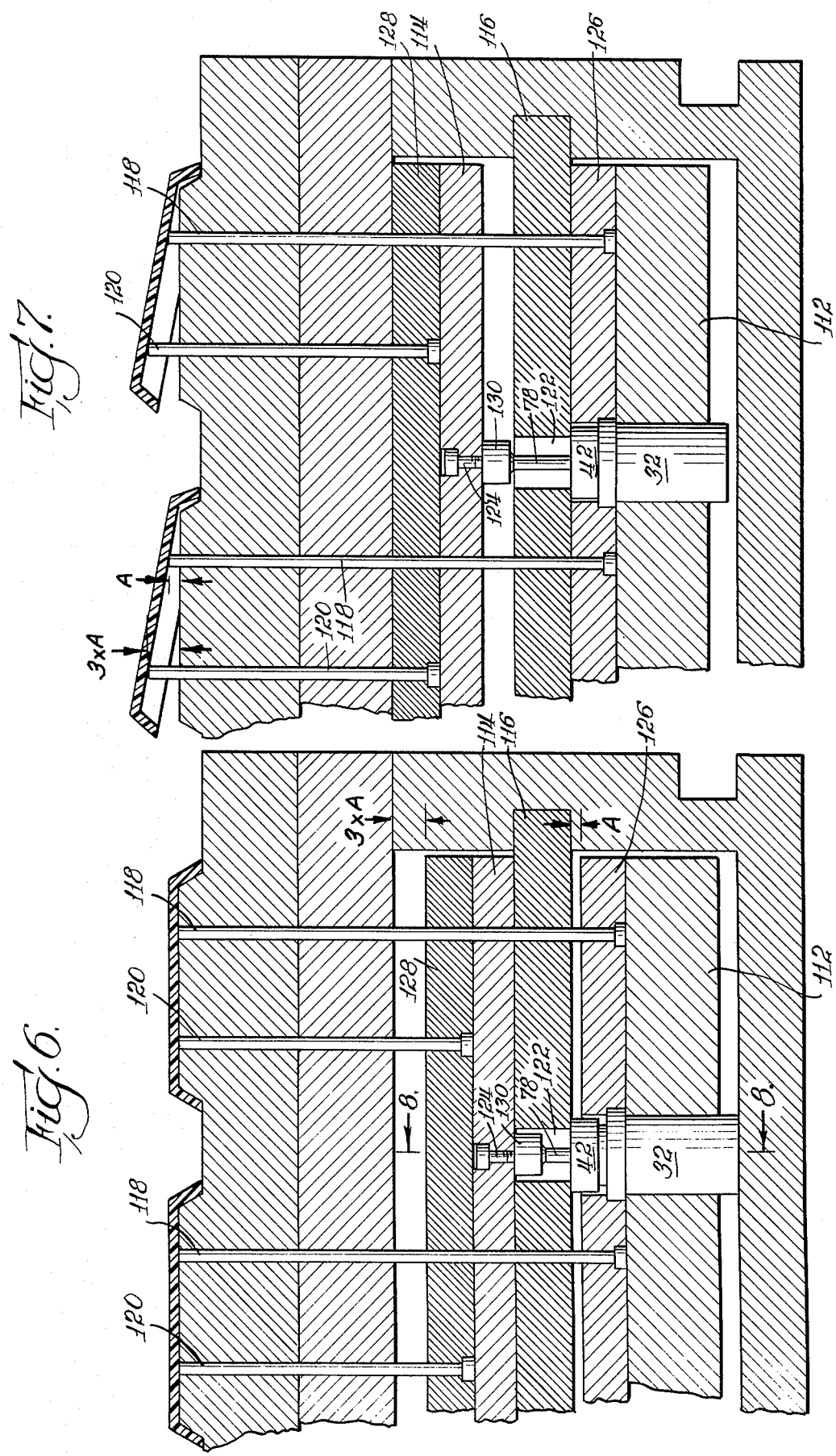

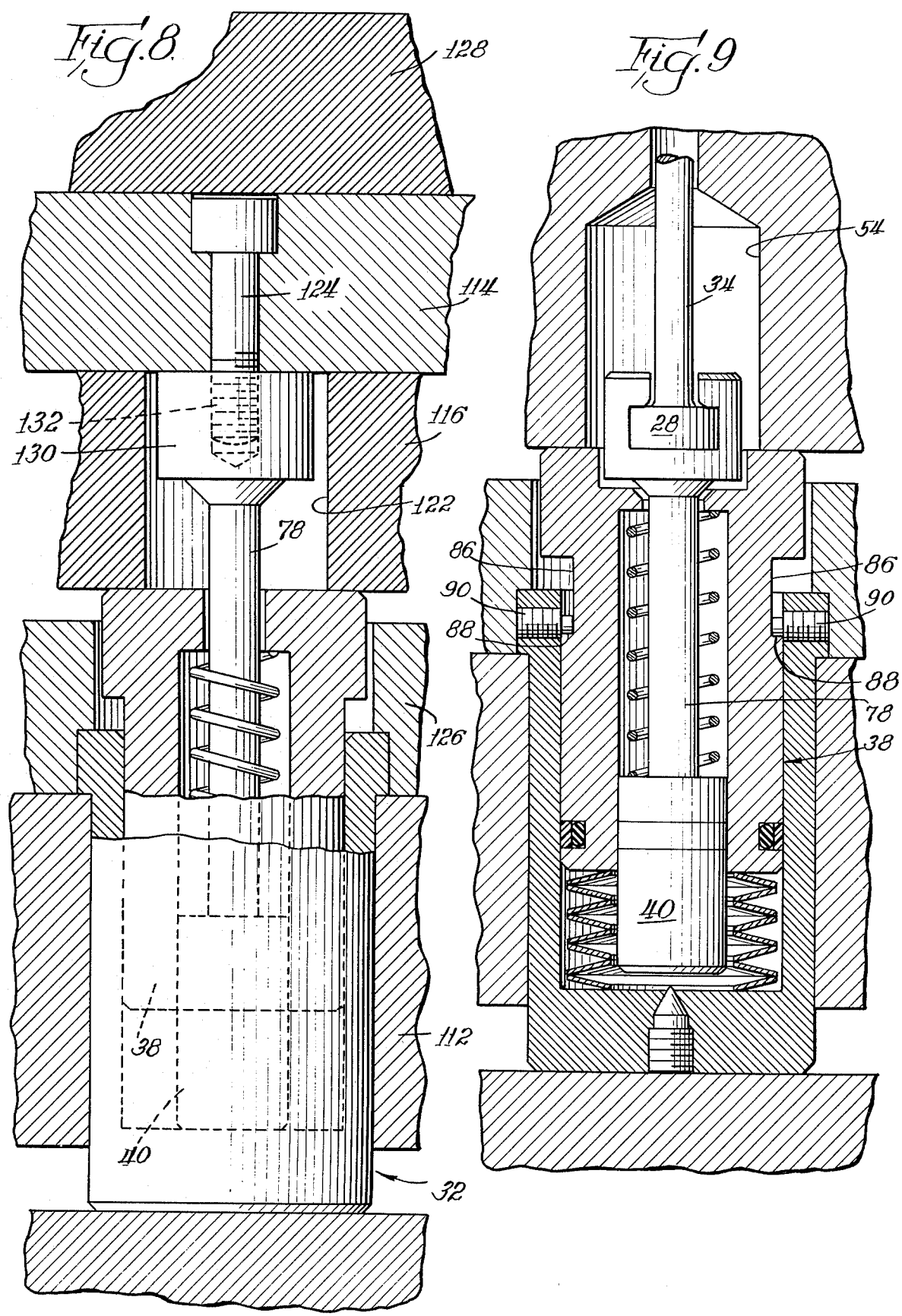

MOLD EJECTOR MULTIPLIER

BACKGROUND OF THE INVENTION

1. Field of Invention

This invention relates to an apparatus for forming a workpiece having a separable forming element in which the workpiece is formed and in which, when the elements are separated, the workpiece must be removed from one of the elements, and is particularly directed to improved means for ejecting the workpiece or dislodging it.

2. Prior Art

In molding apparatus and the like, the workpiece has to be ejected or removed from the mold and for this purpose ejecting rods are arranged to be pushed up through the mold in contact with the workpiece and to dislodge it from the mold. It has been found in practice, however, that such ejectors tend merely to loosen the workpiece and that manual intervention is necessary to complete removal of the workpiece from the mold.

It has been proposed (U.S. Pat. No. 3,893,644) to modify such apparatus by inserting therein means for accelerating or multiplying the speed and length of travel of such ejectors. In one such device referred to in the art as an accelerated ejector, the device comprises two racks operating on a pinion, so that when one rack is depressed, the other one is raised. Thus, when the device is mounted on the ejector plate of a mold with one of the racks affixed to an ejector pin and the other arranged to abut a stud projecting downwardly from the mold when the ejector plate is moved upwardly to move ejector pins upwardly, the one attached to the rack will be moved up at twice the rate of the other. This results from the fact that as the ejector plate is moving the ejector pin up one unit, the accelerator or multiplier is moving the other one up two units. Such devices are difficult to install since they require machining in its ejector plate of an irregular hole and are, moreover, limited to the aforesaid two to one ratio. Thus, for every unit length one rack is pushed down, the other one goes up one unit length, so that as the ejector plate moves up one unit length, each ejector pin is moved up one unit length and, simultaneously, as the rack is depressed by the stud, the other and, consequently, the ejector pin attached thereto, moves up a second unit length. Hence, the maximum and only overall ratio obtainable in such device is a two to one ratio and the maximum ratio in the device itself is one to one, that is, one unit length of the rack down gives one unit length of the other rack up, and vice versa.

OBJECTS OF THE INVENTION

It is an object of the invention to provide a new and improved mold ejector multiplier as well as a new and improved molding apparatus employing such mold ejector multiplier. It is an object of the invention to provide such devices in which a multiplying ratio greater than one to one in the multiplier itself or greater than two to one in the molding apparatus is obtained. It is a further object of the invention to provide a mold ejector multiplier which can be installed in the molding apparatus without expensive or difficult machining operations. Yet another object of the invention is to provide a simple and efficient mold ejector multiplier which is self-lubricating. A still further object of the invention is to provide a mold ejector multiplier which is simple to manufacture and is effective for its intended purpose over a long period of time. Further objects of the invention are to avoid the disadvantages of the prior art and to obtain such advantages as will appear as the description proceeds.

BRIEF DESCRIPTION OF THE INVENTION

This invention relates to improvements in molding apparatus having separable forming elements in which a workpiece is formed and in which, when the elements are separated, the workpiece must be removed from one of the elements, ejector means to engage the workpiece and to dislodge it from the element, actuating means for engaging the ejector means to cause it to move to and from the position at which it engages and dislodges the workpiece, and an ejector multiplier means responsive to the movement of the actuating means to multiply the extent and speed of the movement of the ejector means, and is particularly directed to improvements in said ejector multiplier means, which comprises hydraulic means for accelerating the movement of the ejector means responsive to the movement of the ejector actuating means; and still more particularly, to improvements wherein the hydraulic means comprises a dual piston hydraulic device having one piston responsive to the movement of the actuating means and the other piston responsive to the movement of the first named piston and adapted to move the ejector means, advantageously with the relative size of the pistons being such that the piston which moves the ejector means moves more than one unit for each unit movement of the other piston.

While the invention is being described with particular reference to molding apparatus and to mold ejector multipliers, it is understood that it is equally applicable to any apparatus in which an accelerated movement of one part with reference to another part is desired.

More particularly, the invention relates to a mold ejector multiplier which comprises dual hydraulic cylinders which comprise a hollow cylinder having a closed end adapted to act both as a cylinder for an outer piston and a reservoir for hydraulic fluid in which the outer piston has a hollow bore adapted to receive a second or inner piston and to function as the cylinder therefor. Both pistons are in contact with the hydraulic fluid in the reservoir so that, when one is pushed in, the other is pushed out and vice versa. Advantageously, the pistons are spring biased to the retracted position of the inner piston and also, advantageously, there is provided stop means which limit the inward and outward movement of the pistons. Advantageously, the spring means comprise Bellville washers acting to urge the outer piston out of its cylinder and a coil spring acting to urge the inner piston into the cylinder. Advantageously, the stop means may comprise an extension of the bottom of the inner piston which limits the inner movement of that piston and then consequently inherently limits the outward movement of the outer piston. In an alternative arrangement, stop means may be provided on the cylinder to engage the outer piston. Advantageously, the outer piston has a shoulder adapted to abut the top of the cylinder, thereby limiting the inward movement of the outer piston.

Advantageously, the inner piston comprises a piston head and a piston rod and the outer piston has a shoulder projecting inwardly toward the piston rod with a coil spring on the piston rod under compression between said shoulder and the piston head. Advantageously, the pistons have a packing groove having therein an O-ring under compression acting against a Teflon®seal, thus forcing the Teflon seal into intimate contact with its cylinder.

Also, it is of advantage to provide the bottom of the cylinder with a bleeder valve which may be used to bleed off air or hydraulic fluid or to admit hydraulic fluid.

In practice, it is of advantage to assemble a unit under hydraulic fluid, thereby excluding all air and making it possible to adjust the device to fine tolerances. When the device is charged with hydraulic fluid adjusted to the desired tolerances, the bleeder valve can then be closed and the unit will thereafter maintain the precise tolerances which were originally set.

By making the outer surface of the cylinder cylindrical and providing a collar at the top thereof, mounting of the new mold ejector multiplier in the mold apparatus is extremely simple. All that is necessary is to drill a hole in the ejector plate of the mold, that is, the plate which moves to move the ejector pins in and out of the mold, and to insert the mold ejector multiplier in that bore. It can be fastened therein by any suitable means adapted to fasten the collar to the ejector plate. If desired, means may be provided for attaching the ejector pins to the inner piston so that, when it moves, it will cause the ejector pin attached thereto to move.

The outer piston has a collar which functions to stop the inward movement of that piston and also which functions to engage a stationary part of the molding apparatus when the mold ejector plate is moved toward that part of the apparatus. Thus, when this collar so engages the stationary part mentioned, the continued movement of the ejector plate causes the cylinder to pass up over the outer piston until it reaches the shoulder which will then be the limit of movement of the ejector plate. Simultaneously, as the outer piston is thus forced into the cylinder, the inner piston will be forced out and cause the ejector pin to move upwardly. For each unit movement of the ejector plate, there will be one unit movement of the ejector pin, plus whatever unit movement is due to the movement of the inner piston. The extent of this movement depends upon the relative areas of the outer and inner pistons, which can be more or less than one to one but, advantageously, greater than one to one. Thus, whereas in the prior art the movement of the ejecting pin was limited to a two to one ratio, compared to the ejector plate in the apparatus of the invention, the movement can be greater than two to one, and in a preferred embodiment, will be in the order of three to one. As the rate of movement of the ejector pin is thus correspondingly increased, a greater kick is given to the workpiece so that it is dislodged from the mold without need for manual intervention.

In the foregoing description, the mold ejector multiplier is applied in what is known as a single pin application. In other words, the mold ejector multiplier is attached directly to one ejector pin. It is also possible to use it in a multiple pin application, that is, applications where one set of pins is actuated by a main ejector plate and another set of pins is actuated by an accelerated ejector plate. In such case, the mold ejector multiplier is mounted in the main ejector plate with the inner piston attached to the accelerated ejector plate and with a stationary plate interposed between the two ejector plates. Thus, when the collar of the outer piston engages this stationary plate, the accelerated ejector plate is moved up at an accelerated rate so that the pins which it controls move up at an accelerated or multiplied rate.

BRIEF DESCRIPTION OF THE DRAWINGS

In the drawings:

FIG. 1 is an elevation with parts in section, showing a mold apparatus with a mold ejector multiplier installed in a single pin application.

FIG. 2 is a plan view similar to FIG. 1, but showing the ejector pins in extended position.

FIG. 3 is an elevation, in partial section, of the mold ejector multiplier of the invention taken along line 3—3 of FIG. 1.

FIG. 4 is a view similar to FIG. 3, showing the mold ejector multiplier in an extended position taken along line 4—4 of FIG. 2.

FIG. 5 is a detailed view of part of FIGS. 3 and 4.

FIG. 6 is a side view, in partial section, showing the mold ejector multiplier of the invention in a multiple pin application.

FIG. 7 is a view similar to FIG. 6, but with the ejectors in extended position.

FIG. 8 is a detailed view, in partial section, taken along line 8—8 of FIG. 6.

FIG. 9 is a sectional view of a modified form of the invention.

DETAILED DESCRIPTION OF THE INVENTION

Referring now more particularly to FIGS. 1 and 2, there is shown a modification of the invention, wherein there is illustrated a mold unit assembly adapted to be inserted into an injection molding machine (not shown); 14 represents the bottom half of a two-part mold; 16 represents a molded workpiece thereon; 18, supporting transverse plate rigidly supported on a base 20 adapted to be anchored in the molding machine proper by the channel grooves 22.

Mounted in the base 20 is an ejector actuator plate 24 which is mounted to be moved toward and away from the transverse supporting plate 18 by means not shown. The ejector actuator plate 24 actuates the ejector pin 26 which has a head 28 resting on the ejector actuator plate 24. The ejector pin 26 extends upwardly through a bore in the transverse supporting plate 18 and the mold 14 and terminates flush with or substantially flush with the surface of the mold 14 where it is in contact with or substantially in contact with the workpiece 16. A retainer plate 30 is bolted or otherwise fastened to the ejector actuator plate 24 and holds the ejector pin 26 firmly against the ejector actuator plate.

In an ordinary ejection molding machine, two or more such ejector pins may be provided so that when the ejector actuator plate 24 is moved upwardly, the pins simultaneously move up and lift the workpiece 16 off the mold 14. The workpiece 16 is then removed from the mold manually or mechanically, according to the degree of sophistication of the machine.

One or more of the ejector pins 26 may be arranged to be activated by a mold ejector multiplier or accelerator designed to cause the ejector pin to move upwardly farther and faster than the pins not so actuated. Such a mold ejector multiplier is shown at 32 in FIGS. 1 and 2 which is constructed so that when the ejector actuator plate is moved upwardly to the position shown in FIG. 2, the pin 34 which is attached to the ejector multiplier 32 is moved up to the position shown in FIG. 2. The particular ejector multiplier shown in FIGS. 1 and 2 is designed so that for each unit A of movement of the ejector actuator plate 24, the ejector pin 34 will be moved up three A units. Thus, the ejector pin 32 will be moved up three times as far as the ejector pin 26. Also, it will move up at three times the velocity. Thus, when the ejector actuator plate 24 is moved upwardly, it does not simply just lift the workpiece 16 off the mold 14, but gives it such a kick that the workpiece is knocked out of the machine so that manual or mechanical intervention to remove it from the machine is unnecessary. This is accomplished by providing a hydraulic cylinder 36 with outer and inner pistons 38 and 40 arranged so that when one is pushed into the cylinder, the other is pushed out and vice versa. The outer cylinder 38 has a collar 42, the upper surface 44 of which is adapted to engage the transverse supporting plate 18 and the bottom surface 46 of which is adapted to engage the cylinder 36 when the ejector actuator plate 24 is moved upwardly to the position shown in FIG. 2. As a result of this motion, the inner piston 40 is moved up to the position shown in FIG. 2. When the ejector actuator plate 24 is retracted to the position shown in FIG. 1, the two pistons are returned to the position shown in FIG. 1. This can be accomplished by having the collar 42 attached to the transverse supporting plate 18 or by means as will be more particularly described.

The cylinder 36 has a collar 48 to facilitate mounting of the ejector multiplier 32 in the machine. This mounting is accomplished simply by drilling a hole 50 in the ejector actuator plate 24 of sufficient size to receive the hydraulic cylinder 36, the outside of which is made cylindrical for this purpose. The collar 48, which is also cylindrical, will then rest on the top of the ejector actuator plate 24. The retainer plate 30 is then drilled to provide a stepped bore having a shoulder 52 adapted to engage the collar 48 and thus hold the ejector multiplier unit 32 firmly in the ejector actuator plate 24. At the same time, a hole 54 is drilled in the transverse supporting plate 18 large enough to receive the coupling member 56 which couples the ejector pin 34 to the inner piston 40.

Referring more particularly now to FIGS. 3 and 4, there are shown details of construction of the ejector multiplier unit shown in FIGS. 1 and 2. The hydraulic cylinder 36 has a cylindrical bore 58, a closed bottom 60 and an open top. The outer piston 38 is machined to slide in the bore 58 freely and is provided with an annular channel for holding the packing material 64. The packing material 64 consists of an O-ring 66 and a Teflon sealing member 68. The O-ring 66 is compressed as shown by the sealing member 68 and thus constantly urges the sealing member into close contact with the bore 58. The like combination is applied to the piston head 76. Between the bottom 70 of the outer piston 38 and the bottom 60 of the cylinder 36 are a plurality of Bellville washers 72 which function as spring means for urging the outer piston 38 from the position shown in FIG. 4 to the position shown in FIG. 3.

The outer piston 38 is provided with an axial bore 74 adapted to function as a cylinder for the inner piston 40. The inner piston 40 has a piston head 76 and a piston rod 78 connecting the piston head 76 with the coupling unit 56. The outer piston 38 has a shoulder 80 projecting inwardly toward the piston rod 78. Between this shoulder and the piston head 76 is a coil spring 82 under compression so that the inner piston 40 is continually urged to its innermost position as shown in FIG. 3.

The bottom portion of the cylinder 36, that is, the portion occupied by the Bellville washers 72, functions as a hydraulic reservoir for holding a hydraulic fluid. Thus, when the outer piston 38 is pushed down against this hydraulic fluid, the hydraulic fluid pushes the inner piston up and vice versa.

An advantage of the ejector multiplier unit of the invention is that, by varying or changing the relative areas of the two pistons exposed to the hydraulic fluid, the degree of multiplication or acceleration can be correspondingly changed. Thus, simply by increasing or decreasing the diameter of the bore 74, and correspondingly increasing or decreasing the diameter of the piston head 76, the extent of the multiplication of the travel and velocity of the ejector rod 34 can be correspondingly increased or decreased. Thus, if the area of the bottom 70 of the outer piston 38 is two units and the area of the piston head 76 is one unit, the inner piston 40 will move two units for each unit of movement of the outer piston 38. In such case, the pin 34 will move up three units as the ejector actuator plate 24 is moved up. This is illustrated in FIGS. 1 and 2 where A represents the distance that the ejector actuator plate 24 moves so the whole assembly moves up the distance A. At the same time as the outer piston 38 moves into the cylinder 36, the inner piston moves up two A units. Thus, the ejector 34 moves upwardly 2A + A units (3 A units).

If the area of the bottom 70 of the outer piston 38 were one unit and the area of the piston head 76 one unit, then for each unit movement of the outer piston 38, there would be one unit movement of the inner piston 40 and the net result would be two unit movements of the ejector pin 34. This is the greatest extent of movement of the ejector pin 34 which is possible with the rack and pinion type ejector multipliers of the prior art. The ejector multiplier of this invention therefore is more flexible than those of the prior art and substantial advantages can be obtained by designing the ejector multiplier to have an internal multiplying ratio of greater than one to one, preferably at least 2 to 1, for each movement of the outer piston 38.

Also, the prior art devices, in order to accomodate two racks and a pinion between them, necessarily had to be constructed with a substantially rectangular cross section. Accordingly, the mounting of them in an ejector actuating plate required a major machining operation. The ejector multiplier of the invention, on the other hand, being circular in cross section, can be mounted in the ejector actuator plate with no more complicated operation than the drilling of suitable bores as previously described.

In the modification shown in FIGS. 3 and 4, the piston head 76 is provided with a downwardly extending extension 84. This extension acts as a stop when it hits the bottom 60 of the cylinder 36. Thus, the extent of the inward movement of the inner piston 40 is determined. The extent of the inward movement of the outer piston 38 is determined as above described by the shoulder 46. Since the two pistons are functionally connected by means of the reservoir of hydraulic fluid in the cylinder 36, the stop means on one piston is effectively a stop means on the other. Also, the outward movement of the inner piston 40 is limited by the transverse supporting plate 18. It is not necessary, however, that the collar 42 be always in engagement with the transverse supporting plate 18 but, in that case, it may be desirable to provide other means for limiting the outward movement of the outer piston 38, particularly when the inner piston head 76 is not provided with the extension 84. Such an arrangement is disclosed in FIG. 9 where the outer piston 38 is provided with axial slots or grooves, each terminating in a shoulder 88 adapted to be engaged by a set screw 90.

When the extension 84 is relied upon as a stop for the outward movement of the outer piston 38, it will be understood that the pressure exerted by the Bellville washers 72 in the position shown in FIG. 3 must be less than the inward thrust on the piston 38 due to atmospheric pressure.

In theory, only one set of springs 72 and 82 should be necessary, or none at all, if the collar 42 were attached to the transverse supporting member 18, in view of the effect of atmospheric pressure. In practice, it is desirable to have both springs, or at least the coil spring 82, especially if the collar 42 is attached to the transverse support 18 because, when the devices are new, the internal friction may be greater than can be overcome by the atmospheric pressure. Hence, for reliable and consistent performance from the beginning of installation, it is desirable to have means for returning the outer piston 38, which may be either a connection of the collar 42 to the transverse support 18, or the coil spring 82 which acts to return the inner piston 40 and, if desired, the Bellville washers 72.

In the modification shown in FIGS. 3 and 4, the extension 84 is provided with radial channels 92 and axial channels 94 as shown in FIG. 5 to provide access for the hydraulic fluid and to increase the volume thereof. This also helps in lubrication of the inner piston and cylinder.

In the bottom of the cylinder 36 there is provided a bleeder valve 96, which comprises a needle valve having a vent 98 communicating with an axial bore 100. The valve comprises a conical top part 102 mounted on a threaded base 104. The conical top part 102 is adapted to seat in a correspondingly conical portion of the bottom of the cylinder 36 so that, when the base 104 is screwed in, the conical portion 102 seats tightly against the conical portion of the base 36 and seals off the hydraulic compartment in the base of the cylinder 36. The bleeder valve is located with the apex of the cone 102 in the center of the cylinder 36. The radial channels 92 are arranged to intersect at the center of the extension 84, thereby providing space for the projecting portion of the tip of the cone 102.

In the modification shown in FIG. 9, the piston head 76 is prevented from touching this point by means of the stop provided by the shoulders 88 and the set screws 90.

The coupling member 56 comprises a cylindrical head 106 which is undercut to provide shoulders 108 to engage the head 28 of the ejector pin 34 and a slot 110 for the ejector pin.

In the modification above-described, the ejector multiplier is shown as being applied directly to an ejector pin. In the modification shown in FIGS. 6, 7, and 8, the ejector multiplier is applied to an accelerated ejector plate or manifold adapted to raise and lower a plurality of ejector pins. In these figures, 112 represents the ejector actuator plate, 114, the accelerated ejector actuator plate, and 116, a stationary plate between the two. One set of ejector pins 118 are actuated by the ejector actuating plate 112 and another set 120 are actuated by the accelerated ejector actuating plate 114. This ejector multiplier unit 32 is mounted in the ejector actuator plate 112, as described above, with the collar 42 adapted to engage the stationary plate 116. The inner piston 40 extends through a bore 122 in the stationary plate 116 and is attached to the accelerated ejector actuating plate 114 by means of the bolt 124 or other suitable fastening means. The ejector pins 118 and 120 are fastened to the ejector accelerator plates 112 and 114 by retainer plates 126 and 128, respectively, as previously described. The ejector multiplier unit 32 is also fastened to the ejector actuator plate 112 by the retainer plate in the manner previously described. FIG. 8 shows details of construction of the ejector multiplier 32 and how it is mounted in the device of FIGS. 6 and 7. It will be seen that the piston rod 78 has an enlarged head 130 adapted to abut the accelerated ejector activator plate 114 and is threaded at 132 to receive the bolt 124.

It is desirable in the assembling of the ejector multiplier to assemble the two pistons, open the bleeder valve 96 and assemble the cylinder 36 and the piston assembly under hydraulic fluid in order to exclude the possibility of entrapment of air. In the modification shown in FIG. 3, the assembled piston unit is inserted until the inner piston 40 rests against the bottom 60 of the cylinder 36. The outer piston 38 is then pushed in against the Bellville spring washers 72 until the desired clearance or spacing between the shoulder 46 of the collar 42 and top 52 of the collar 48 is obtained. The bleeder valve is then closed and the device removed from the oil bath. In this way, precise tolerances are met. This is another advantage for having the extension 84 on the piston head 76 since, when the extension is firmly seated against the bottom 60 of the cylinder 36, which will be effected by the coil spring 82, all that is necessary is to push the outer cylinder in against the Bellville spring washers 72 to the desired clearance and then close the valve. In the modification shown in FIG. 9, where the clearance is determined by the location of the shoulder 88 and the set screw 90 and the inward movement of the inner piston 40 is determined by the seating of the beveled portion 134 of the coupling member 56 on the inwardly projecting shoulder 80 of the outer piston 38, the tolerances are already set and all that is necessary is to insert the assembled piston unit into the cylinder 36, push the unit in until the set screws 90 can be screwed in to engage the shoulder 88, then close the bleeder valve 96 and withdraw the unit from the bath. It will be seen that the unit for FIGS. 3 and 4 has the advantage in assembly that the tolerance may be adjusted or varied as desired in the assembly.

It is to be understood that the invention is not to be limited to the exact details of operation or structure shown and described, as obvious modifications and equivalents will be apparent to one skilled in the art.

I claim:

1. In an apparatus for forming a workpiece which comprises separable forming elements in which a workpiece is formed and in which, when the elements are separated, the workpiece must be removed from one of them, ejector means adapted to engage said work piece and to dislodge it from said one element, ejector actuating means for engaging said ejector means to cause it to move to and from a position at which it engages and dislodges said workpiece, ejector multiplier means responsive to the movement of said ejector actuating means to multiply the extent and speed of movement of said ejector means, the improvement in said ejector multiplier means which comprises hydraulic means for accelerating the movement of the ejector means responsive to the movement of said ejector actuating means.

2. The apparatus of claim 1, in which said hydraulic means causes said ejector means to move more than two units for each unit movement of said ejector actuating means.

3. The apparatus of claim 1, in which said hydraulic means comprises a dual piston hydraulic means having one piston responsive to the movement of said actuating means and an outer piston responsive to the movement of said one piston and operatively associated with said ejector means so that movement of said one piston causes movement of said ejector means, the relative size of said pistons being such that the said other piston moves more than one unit for each unit movement of said one piston.

4. The apparatus of claim 3, in which said one piston is an outer piston mounted to reciprocate in a hollow cylinder having a closed end adapted to act both as a cylinder and as a hydraulic fluid reservoir and the other piston is an inner piston mounted to reciprocate in a cylindrical bore in said outer piston whereby, when one piston is pushed in against the hydraulic fluid in said reservoir, the other piston is pushed out and vice versa.

5. The apparatus of claim 4, in which the pistons are biased to the retracted position of said inner piston.

6. The apparatus of claim 5, in which stop means is provided to limit the inward and outward movement of said inner piston.

7. The apparatus of claim 6, in which said stop means comprises an extension of the bottom of said inner piston which limits the inward movement of said inner piston.

8. The apparatus of claim 6, in which said stop means comprises means for limiting the inward and outward movement of said outer piston.

9. The apparatus of claim 8, in which said stop means comprises a shoulder on said outer piston adapted to abut the top of said cylinder.

10. The apparatus of claim 8, in which said stop means comprises an inset shoulder on said outer piston adapted to engage a stop projecting inwardly from said cylinder.

11. The apparatus of claim 8, in which said stop means comprises a shoulder on said outer piston adapted to abut the top of said cylinder and an inset shoulder on said outer piston adapted to engage a stop projecting inwardly from said cylinder and in which said shoulders are so spaced as to admit only a limited in and out movement of said outer piston.

12. The apparatus of claim 8, in which said stop means comprises a shoulder on said outer piston adapted to abut the top of said cylinder and thereby limit the inward movement of said outer piston and an extension of the bottom of said inner piston which limits the inward movement of said inner piston, the outward movement of each piston being inherently limited by the inward movement of the other one.

13. The apparatus of claim 5, in which the biasing means comprises a plurality of Bellville washers between the bottom of said outer piston and the bottom of said cylinder.

14. The apparatus of claim 5, in which the biasing means comprises a coil spring arranged to urge the said inner piston inwardly.

15. The apparatus of claim 5, in which the biasing means comprises Bellville washers arranged to urge said outer piston outwardly and a coil spring arranged to urge said inner piston inwardly.

16. The apparatus of claim 4, in which said pistons comprise packing grooves filled with an O-ring and a Teflon seal, said O-ring being under compression thereby forcing said Teflon seal into intimate contact with the cylinder wall.

17. The apparatus of claim 4, in which said cylinder has a bleeder valve in the bottom thereof.

18. The apparatus of claim 7, in which said cylinder has a bleeder valve in the bottom thereof and having a point projected into said cylinder and in which the bottom of said inner cylinder has a recess adapted to accomodate said point.

19. The apparatus of claim 7, in which the extension of said inner piston has radial grooves across the bottom thereof.

20. The apparatus of claim 19, in which the extension of said inner piston has axial grooves communicating with said radial grooves.

21. The apparatus of claim 14, in which said inner piston comprises a piston head and a piston rod and said outer piston has a shoulder projecting inwardly toward said piston rod and in which said coil spring is under compression between said piston head and said shoulder.

22. The apparatus of claim 4, in which the apparatus has a stationary means through which said ejector means moves, in which said cylinder is mounted to move with said ejector actuating means toward said fixed means and in which said outer piston is adapted to engage said fixed means whereby, on continued movement of said ejector actuating means toward said fixed means, said outer piston is forced into said cylinder and said inner piston, as a consequence thereof, is forced out, whereby one unit movement of the ejector actuating means causes one plus more than one unit movement of the ejector means.

23. The apparatus of claim 4, in which the relative size of said outer piston and said inner piston is such that one unit movement of said outer piston inwardly causes at least two unit movements of said inner piston outwardly, whereby one unit movement of said ejector actuating means causes one plus at least two unit movements of said ejector means.

24. The apparatus of claim 23, in which said outer piston has a circumferential shoulder, the bottom of which is adapted to abut the top of said cylinder and limit the inward movement of said outer piston and the top of which is adapted to engage said fixed member when the ejector actuating means is moved toward said fixed member and in which stop means is provided to limit the outward movement of said outer piston.

25. The apparatus of claim 24 in which Bellville spring washers are interposed between said cylinder and said outer piston to urge that piston outwardly and in which coil spring means is provided to urge said inner piston inwardly.

26. The apparatus of claim 25, in which said inner piston has a piston head and a piston rod and said outer piston has a shoulder projecting inwardly toward said piston rod and in which said coil spring is under compression between said piston head and said shoulder.

27. The apparatus of claim 26, in which said piston head has an extension adapted to abut the bottom of said cylinder and thereby limit the inward movement of said inner piston, the length of said extension and the amount of hydraulic fluid in said reservoir being such that when said extension rests on the bottom of said cylinder, the said piston head is still in the inner cylindrical portion of said outer piston.

28. The apparatus of claim 26, in which said piston rod has means at the outer end thereof for connecting the same with said ejector means.

29. The apparatus of claim 22, in which said cylinder has a cylindrical outer dimension having a collar at the top thereof and is mounted in a cylindrical bore in said ejector actuating means with said collar resting on the top of said cylindrical bore and in which a retainer means is fastened to said ejector actuating means in engagement with the top of said collar thereby securing said cylinder in said ejector actuating means.

30. The apparatus of claim 27, in which said cylinder has a cylindrical outer dimension having a collar at the top thereof and is mounted in a cylindrical bore in said ejector actuating means with said collar resting on the top of said cylindrical bore and in which a retainer means is fastened to said ejector actuating means in engagement with the top of said collar thereby securing said cylinder in said ejector actuating means.

31. The apparatus of claim 4 in which said ejector actuating means comprises a main ejector actuating means and an accelerated ejector actuating means, and in which said outer piston is actuated by said main ejector actuating means and said accelerated ejector actuating means is actuated by said inner piston.

* * * * *